United States Patent [19]

Emoto

[11] Patent Number: 5,639,175

[45] Date of Patent: Jun. 17, 1997

[54] THREADED PAPER TUBE

[75] Inventor: Ryuichi Emoto, Habikino, Japan

[73] Assignee: Tanaka Shikan Co., Ltd., Osaka, Japan

[21] Appl. No.: 620,029

[22] Filed: Mar. 21, 1996

[30] Foreign Application Priority Data

Jun. 9, 1995 [JP] Japan ................................ 7-168290
Dec. 20, 1995 [JP] Japan ................................ 7-349602

[51] Int. Cl.$^6$ .................................................. F16B 7/18
[52] U.S. Cl. .......................... 403/109; 403/343; 403/404; 411/905; 248/405
[58] Field of Search ........................ 403/109, 343, 403/306, 404, 377; 108/144, 159; 248/405, 406.1, 138.4; 411/546, 535, 536, 905; 297/461

[56] References Cited

U.S. PATENT DOCUMENTS

| | | | |
|---|---|---|---|
| 1,104,891 | 7/1914 | Heusser ............................ | 248/188.4 X |
| 2,535,618 | 12/1950 | Vanderbeek ........................ | 248/188.4 |
| 3,059,888 | 10/1962 | Lie .................................... | 403/109 X |
| 3,104,493 | 9/1963 | Nalle ................................ | 248/188.4 |
| 3,150,853 | 9/1964 | Lisbin ............................... | 248/188.4 |
| 4,318,353 | 3/1982 | Friedman et al. .................. | 108/144 X |

FOREIGN PATENT DOCUMENTS

| | | | |
|---|---|---|---|
| 1133763 | 4/1957 | France .............................. | 248/188.4 |
| 494140 | 3/1930 | Germany ........................... | 248/405 |
| 390 | 1/1901 | United Kingdom ................ | 248/188.4 |

Primary Examiner—Harry C. Kim
Attorney, Agent, or Firm—Darby & Darby

[57] ABSTRACT

A threaded paper tube includes a multiple paper tube having an inner tube with spiral ridges on its outer surface, and an outer tube and a tightening robe each having grooves on their inner surfaces which are in the same pitch as the spiral ridges. The total length of the threaded paper tube may be changed by adjusting the screwing extent between the inner and outer tubes, and the total length may then be fixed by tightening the tightening tube against the outer tube. The ridges and grooves are provided as steps formed on the inner tube's outer surface, the outer tube's inner surface and the tightening tube's inner surface using a ribbon-like shaped paper material which is adhered and fixed at the same pitch on the surfaces of the tubes.

1 Claim, 5 Drawing Sheets

THREADED PAPER TUBE

BACKGROUND OF THE INVENTION

The present invention relates to a structure of a threaded paper tube which is freely changeable of its total length, simple and easy to manufacture and also readily disposable by burning.

A screwing structure conventionally widely known is to use a tubular member having thread grooves on its inner surface and a corresponding tubular member or a cylindrical member having thread grooves on its outer surface, typically such as a combination of a bolt and a nut. Furthermore, there has been such a concept that an elongated nut set in length larger than usual ones may be used to enable adjustment of the total length of the whole structure by means of the extent of screwing between the nut and bolt unless the end portion of the bolt extends out of the nut. But, the feature is hitherto seen and adopted (thereby not novel) in the structure of "turnbuckle" or that of an adjustment mechanism for adjusting legs length of machines or tables to level them.

The conventional screwing features have been applied, for example, in a table with four legs, in such a manner that female screws are burried at lower ends of the table legs and male screws having flanges are screwed with the female screws, in order to provide fine adjustment of length of the table legs for enabling the table to be levelled of its surface or to be eliminated of shakiness.

The conventional features have the following defects. In case of using the screws of larger diameter, they inherently and necessarily become much larger in weight. And the screws cannot be set in pitches to be substantially large, thereby be not capable of having a large extent of change of the total length. Furthermore, the screws are not easy to produce, whereby necessitating high cost to produce.

In the meantime, a spiral-winding paper tube has been often used as a winding core for synthetic fiber yarn or as a trunk portion of a cylindrical container. Such paper tubes are manufactured basically in such manner that a material paper in a ribbon-like shape is wound continuously and spirally on a mandrel used as a core while the material being adhered by use of an adhesive, thereafter to be removed from the mandrel. The features of the foregoing screws and the feature of the abovesaid spiral-winding paper tube are different at all in the manufacturing methods and shapes but are identical to each other as having the spiral portions.

SUMMARY OF THE INVENTION

The inventor made study zealously under the aforesaid circumstances and has achieved the present invention. The present invention relates to a threaded paper tube comprising a multiple paper tube including an inner tube having spiral ridges on its outer surface, and an outer tube and a tightening tube each having on their inner surfaces grooves in the same pitch as of said spiral ridges, so that the total length of the threaded paper tube may be changed by adjustment of the screwing extent between the inner and outer tubes and said total length after changed may be fixed by tightening the tightening tube against the outer tube, wherein the ridges and grooves are provided by steps defined by the the inner tube's outer surface, outer tube's inner surface and tightening tube's inner surface and a ribbon-like shaped material paper adhered and fixed at the same pitch on those surfaces.

In other words, the present invention is a proposal of a multiple paper tube which is a screwing structure in the type that the total length is changeable by means of the extent of screwing between the screwing members, and is easily manufactured by use of an ordinary paper tube manufacturing device.

DETAILED DESCRIPTION OF THE INVENTION

The conventional manufacturing device for paper tube produces the paper tube by continuously and spirally winding the material paper on the mandrel as a core and causing the material paper to adhere by use of an adhesive as referred to above. In use of such manufacturing device for production of the threaded paper tube according to the present invention, for example, for a process to adhere and fix a ribbon-like shaped material paper on the outer surface of the inner tube so as to form the ridges, such a manner may be usable. That is, two pieces of a ribbon-like material paper, which have thickness in some extent and only one of them being applied with the adhesive, are wound (together side by side without an interval therebetween) on the surface of the previously finished paper tube (a cylindrical body) placed on the mandrel. And the one of the pieces of ribbon-like shaped material paper not applied with the adhesive is then removed. Thickness of the ribbon-like shaped material paper is preferably to be substantial so as to have sufficient strength for forming the steps defined by the ridges or grooves. For the purpose, a material paper having small thickness used for an ordinary paper tube manufacturing may be layered to have suitable thickness. But, in view of the tests made by the inventor, it is rather hard to layer the material paper with keeping a constant pitch in case of forming the steps by layering the material paper since the diameter of the steps are gradually made larger. Thus, the inventor adopted a material paper having larger thickness. In any case, the inner tube provided with the ridges may be completed by making use of the conventional paper tube manufacturing facilities as it is and only adding the process for removing the one of the two pieces of ribbon-like material paper. In case that setting of the winding angles of the adhesive-applied ribbon-like material paper can be strictly controlled, only one piece of the ribbon-like material paper may be used and wound without use of the foregoing two pieces winding feature. In this case, the paper tube provided with the ridges is completed under the circumstances or conditions for the ordinary manufacturing of the paper tube.

For adhering and fixing the ribbon-like material paper on the inner surface of the outer tube to thereby form the grooves, two pieces of ribbon-like shaped material paper are wound directly on the mandrel (whose diameter is equal to the outer diameter of the cylindrical body part of the aforesaid inner tube provided with the ridges) with the inner sides of the two pieces of material paper being not applied with an adhesive but the outer side of one of these pieces of material paper being adapted to be applied with an adhesive. The two pieces of material paper are wound on the mandrel in the same manner as of the ordinary manufacturing of paper tube. Finally, that one piece of ribbon-like material paper not applied with the adhesive is removed to finish the outer tube process.

The total width of the two pieces of ribbon-like material paper wound together side by side on the inner tube is equal to that on the outer tube. But, the two pieces of material paper are not necessarily required to be equal in width to each other. The one piece of material paper which finally to be removed may be made slightly larger in width than the other one (which to be finally remained) to allow the ridges to be fit into the grooves, so that the ridges and corresponding grooves can have play in meshing, whereby a possible deformation by expansion, for example, through moisture absorption can be covered to some extent, and a larger frictional force does not act between the corresponding stepped parts (i.e., the ridges and corresponding grooves), leading to improvement of contorollability.

The tightening tube has basically the same structure as of the outer tube. Thus, the outer tube formed in the aforesaid manner may be adopted as the tightening tube. In case of setting the length of the tightening tube to be larger, the scale of change of the total length of the threaded paper tube according to the present invention becomes smaller. Practically, the tightening tube is preferably to be shorter than the outer tube. The tightening tube is a member provided for preventing that the outer tube is rotated, with respect to the inner tube, by load or vibration, causing the total length of the threaded paper tube to be reduced. Principle for the tightening tube corresponds to that of fixation by use of "double nut".

Use of the threaded paper tube according to the present invention may be so realized that the free ends of the paper tubes are provided with flanges and fit, for example, between the furniture and the ceiling to prevent the furniture's falling down against vibration from earthquake or the like, or that the paper tubes may be applied as legs for tables to provide a means of freely adjusting the height of the table. Also, shakiness of the table legs can be readily eliminated as conventionally. Furthermore, a plurality of the tightening tubes may be fit onto the paper tubes, and a plate-like member having bores substantially equal in diameter to the outer diameter of the inner tubes may be sandwiched and supported between the tightening tubes to provide a simple shelf adjustable in height.

Basically, the present invention claims the patent on the threaded paper tube itself having the aforesaid structure but does not limit the scope of right to the abovesaid usage of such threaded paper tube. Hence, the present invention may be applicable also to any other than the abovesaid usages.

EMBODIMENTS

Next, the present invention will be detailed with referring to the examples shown in the attached drawings.

Figure 1A:
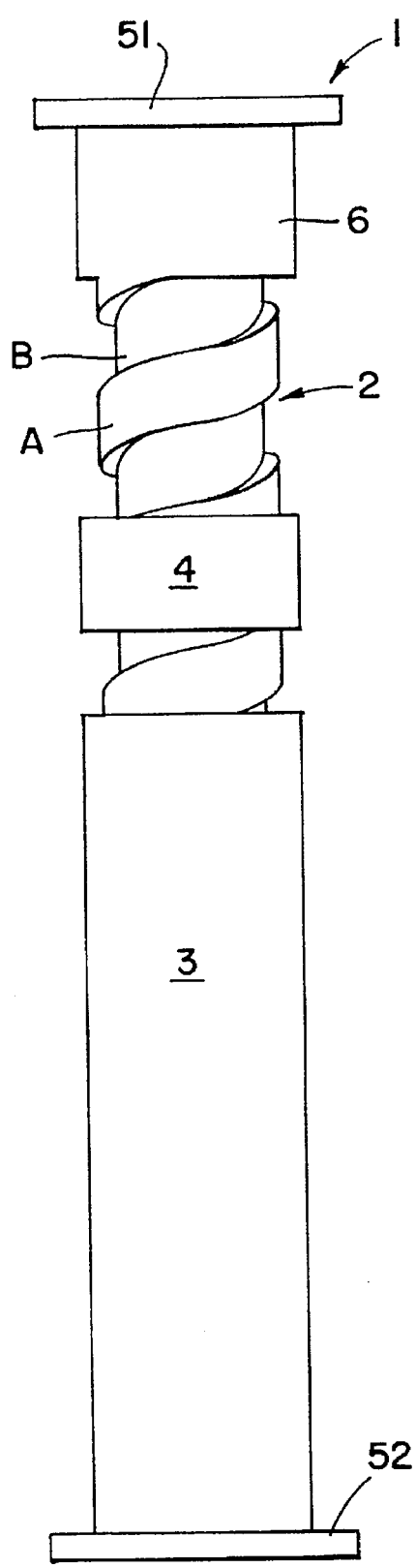
FIGS. 1(a) and 1(b) show an example of the threaded paper tube according to the present invention, FIG. 1(a) being a front view and FIG. 1(b) a sectional view.
Figure 1B:
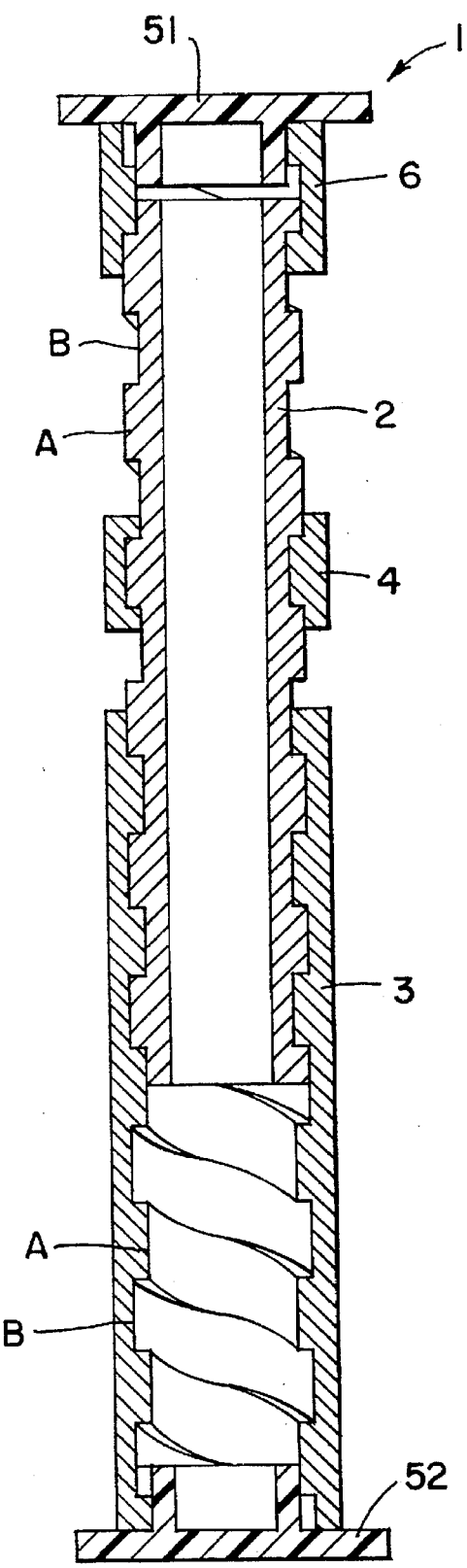

FIGS. 1(a) and 1(b) show an example of the threaded paper tube according to the present invention. As clearly seen in the drawing, the threaded paper tube 1 has a basic structure consisting of a combination of three paper tubes, i.e., an inner tube 2, an outer tube 3 and a tightening tube 4. Ridges $\underline{A}$ and grooves $\underline{B}$ are formed on the outer surface of the inner tube 2, on the inner surface of the outer tube 3 and on the inner surface of the tightening tube 4. An upper flange 51 and a lower flange 52 are added at the upper end of the inner tube 2 and at the lower end of the outer tube 3 to complete the whole structure of the threaded paper tube. The lower flange 52 is fit directly onto the outer tube 3, and the upper flange 51 is mounted to the paper tube by fitting the flange 51 onto the upper end of a gripping head 6 which is screwed with the inner tube 2 at its upper end. The outer tube 3, tightening tube 4 and gripping head 6 are provided by cutting a long paper tube which is produced by use of the same manufacturing apparatus. In the present example, the length of the tightening tube 4 and the gripping head 6 is set to be smaller and that of the outer tube 3 larger. Hence, the gripping head 6 is a member serving as a hold in adjusting the substantial length of the threaded paper tube 1, and the gripping head is formed with one portion of the same paper tube having the same inner diameter to which paper tube the upper flange 51 and lower flange 52 are to be fit respectively, thereby contributing to reduction of the manufacturing cost.

Furthermore, as clearly seen in the drawing, the tightening tube 4 is screwed and fit to the inner tube 2 to be rotated downwardly and tightened at the upper end of the outer tube 3. For the operation, it is required only that user holds the outer tube 3 and tightening tube 4 by hand and rotates the tightening tube 4. By this operation, the threaded paper tube 1 according to the present invention is brought into the state that the threaded paper tube 1 is no longer decreased of its substantial length even when it is subjected to a rather high load (the effect is mechanically identical to that of the double-nut).

Figure 2A:
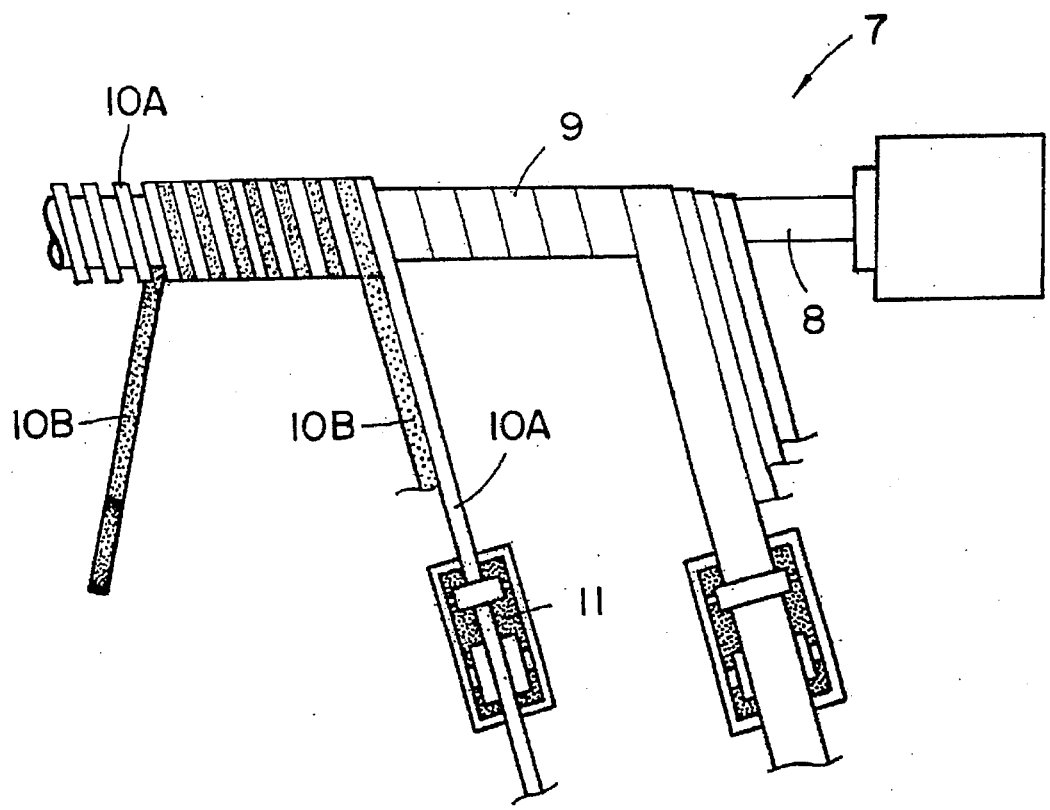
FIGS. 2(a) and 2(b) show an example of a manufacturing method for the threaded paper tube according to the present invention, FIG. 2(a) being a schematic plan view and FIG. 2(b) a schematically sectional view.
Figure 2B:
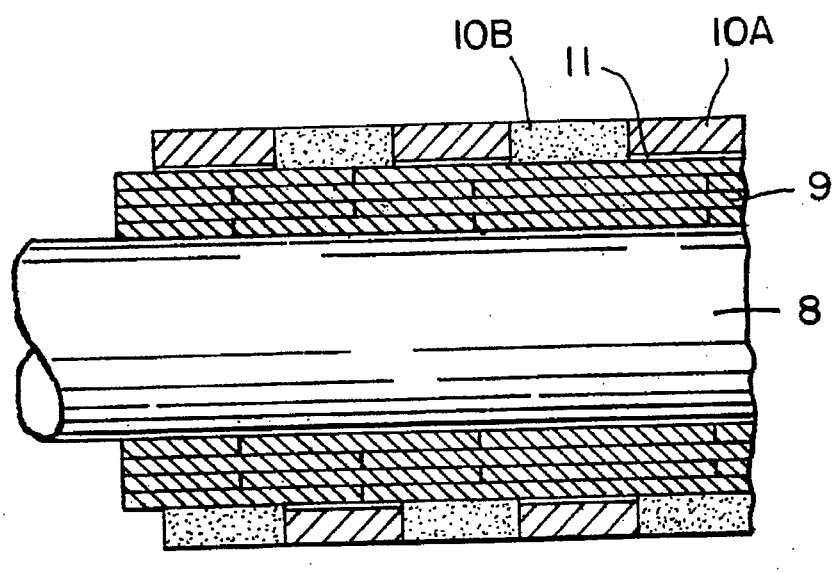

FIGS. 2(a) and 2(b) schematically show an example of the manufacturing method for the inner tube 2 of the threaded paper tube. First, a paper tube 9 having a suitable thickness is produced, by the conventional technique, on the mandrel 8 of a paper tube manufacturing apparatus 7 (only a principal portion thereof shown in the drawing). Two pieces of ribbon-like shaped material paper 10A, 10B are continuously wound on that paper tube 9, having no interval and overlapping between the two pieces of paterial paper. The winding angle in this case is naturally fixed by the outer diameter of the paper tube 9 and the total width of the two pieces of the material paper 10A, 10B (FIG. 2(a)).

Adhesion between the paper tube 9 and the ribbon-like shaped material paper required upon the winding is carried out only at the one of the two pieces of material paper. In detail, as seen in FIG. 2(b), only the one piece of material paper 10A is applied with an adhesive 11 for adhesion on the paper tube 9, and the other piece 10B being not applied with the adhesive. This piece 10B may be removed at the stage that the adhesive 11 becomes hardened, so that the first one piece 10A adhered on the paper tube 9 forms a ridge $\underline{A}$ and the space left by the removed piece 10B forms a groove $\underline{B}$. The product is cut in a suitable length to complete the inner tube 2.

Figure 3A:
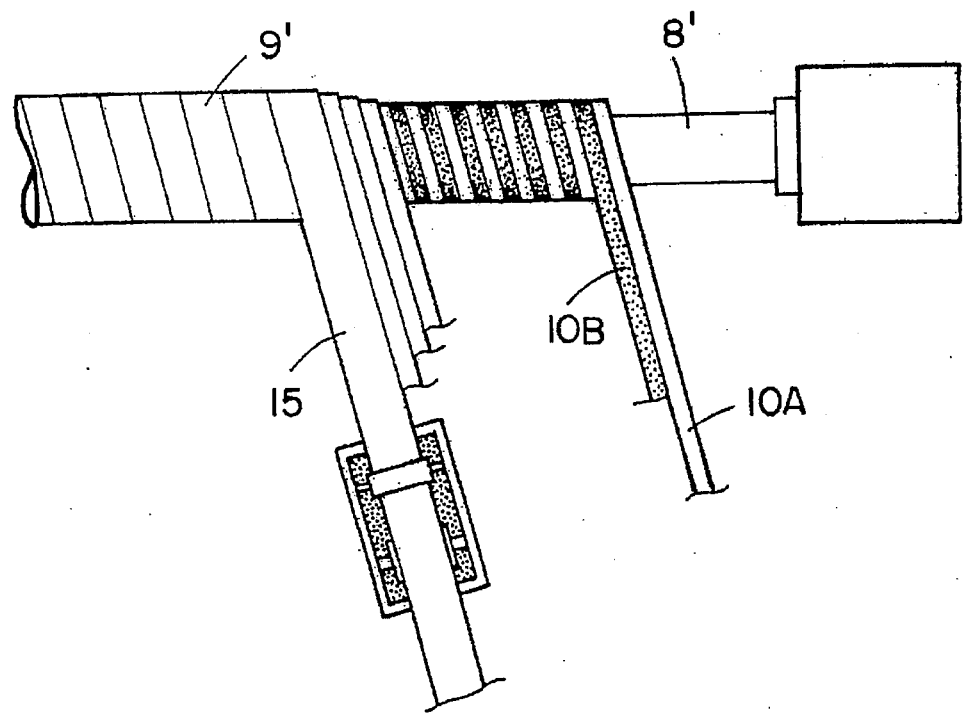
FIGS. 3(a) and 3(b) show another example of a manufacturing method for the threaded paper tube, FIG. 3(a) being a schematic plan view and FIG. 3(b) a schematically sectional view.
Figure 3B:
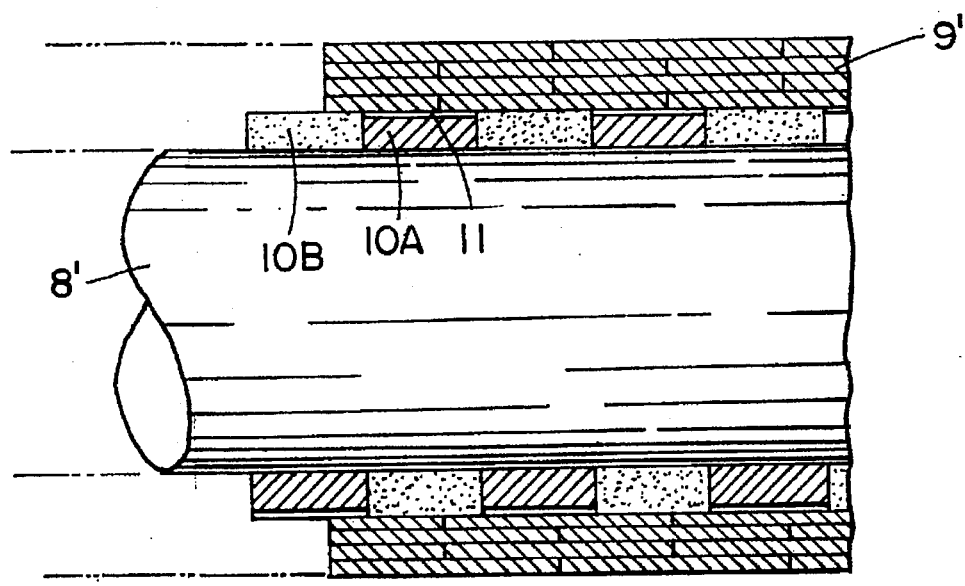

FIGS. 3(a) and 3(b) schematically show an example of a manufacturing method for a paper tube having steps on the inner surface, i.e., the outer tube 3 and tightening tube 4. Two pieces of ribbon-like shaped material paper 10A, 10B are continuously wound on the mandrel 8', having no interval and overlapping between the two pieces of material paper. In this case, the two pieces of material paper are not adhered to the mandrel 8', and one of the two pieces of material paper (the piece 10A in the shown example) is applied with an adhesive 11 only at the outer surface (FIG. 3(a)).

A material paper 11 is then wound on the two pieces of material paper in a manner of the conventional paper tube manufacturing. Before or after cutting the product in a suitable length, the other piece of ribbon-like shaped material paper (10B in the shown example) not adhered to the paper tube 9' may be removed. It is to be noted that the diameter of mandrel 8 in FIG. 2 is not equal to that of mandrel 8' in FIG. 3, while the outer diameter of the paper tube 9 in FIG. 2 is almost equal to that of the mandrel 8' (Strictly speaking, the outer diameter of the paper tube 9 is slightly smaller than that of the mandrel 8').

Figure 4:
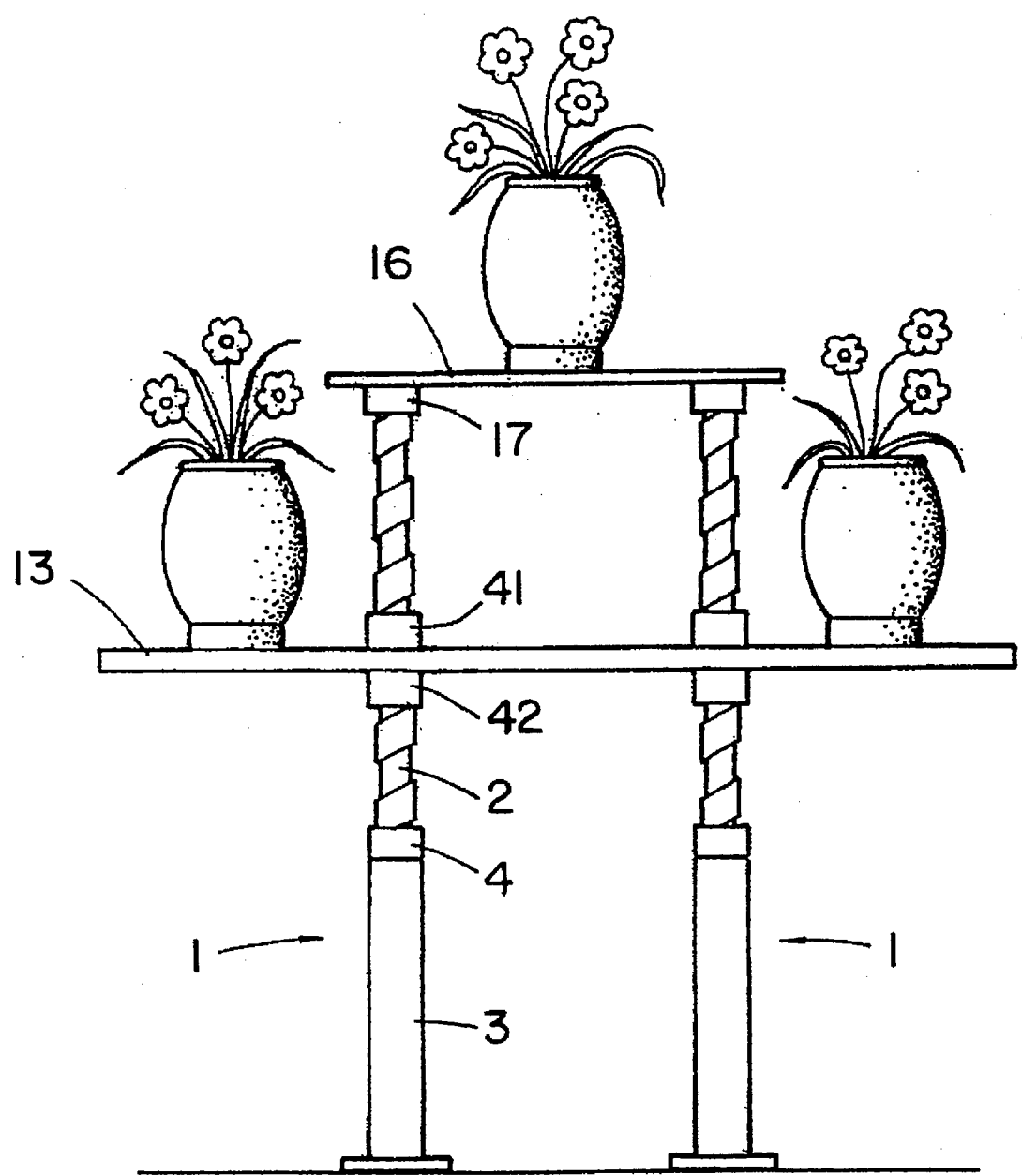
FIG. 4 is a schematic front view showing another example of the threaded paper tube according to the present invention.

FIG. 4 shows another example of the threaded paper tube according to the present invention. The threaded paper tube 1 has on the inner tube 2 extending above the tightening tube 4 an upper part 41 of shelf tightening tube and a lower part 42 of shelf tightening tube which have the same structure of screwing on the inner tube 2 as of the other tubes. Fit between the upper and lower parts of shelf tightening tube 41, 42 is an intermediate shelf 13 which has bores almost equal in diameter to the outer diameter of the ridges A of the inner tube 2. The upper and lower parts 41, 42 of shelf tightening tube are not provided with a flange in the shown example but may have the same. Furthermore, an upper shelf 16 at the uppermost end of the example is provided with a female screwing member 17 which is adhered to the upper shelf and has the ridges A and grooves B similarly to the outer tube 3, so that the inner tube 2 is screwed with the screwing member 17 to set and fix the upper shelf 16.

Figure 5A:
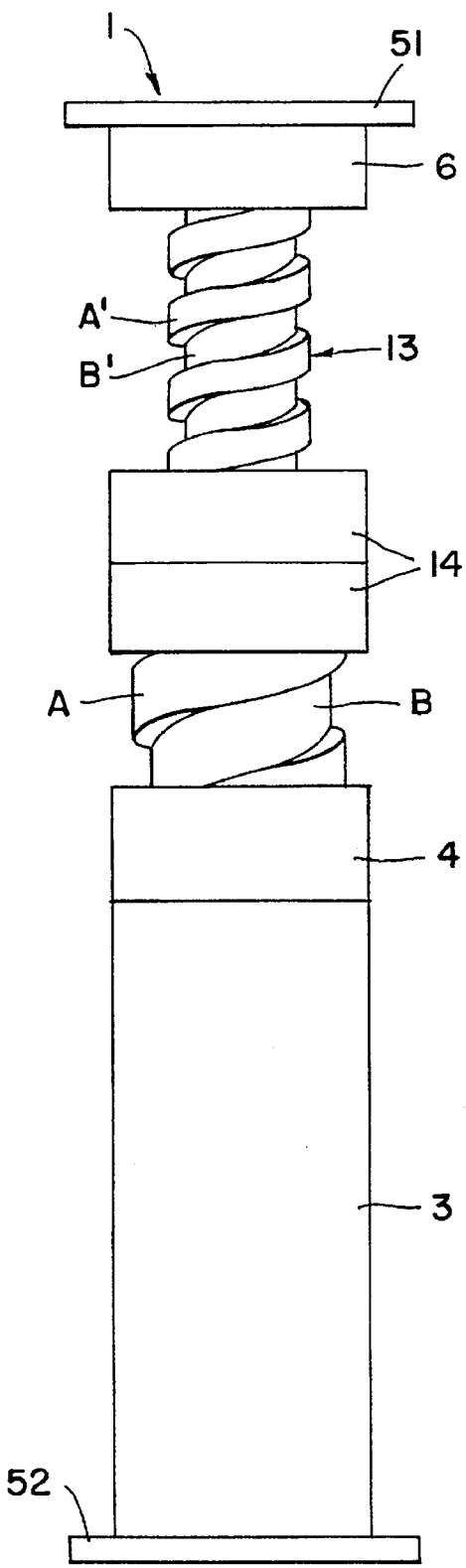
FIGS. 5(a) and 5(b) show a further example of the threaded paper tube according to the present invention, FIG. 5(a) being a schematic front view and FIG. 5(b) a schematically sectional view.
Figure 5B:
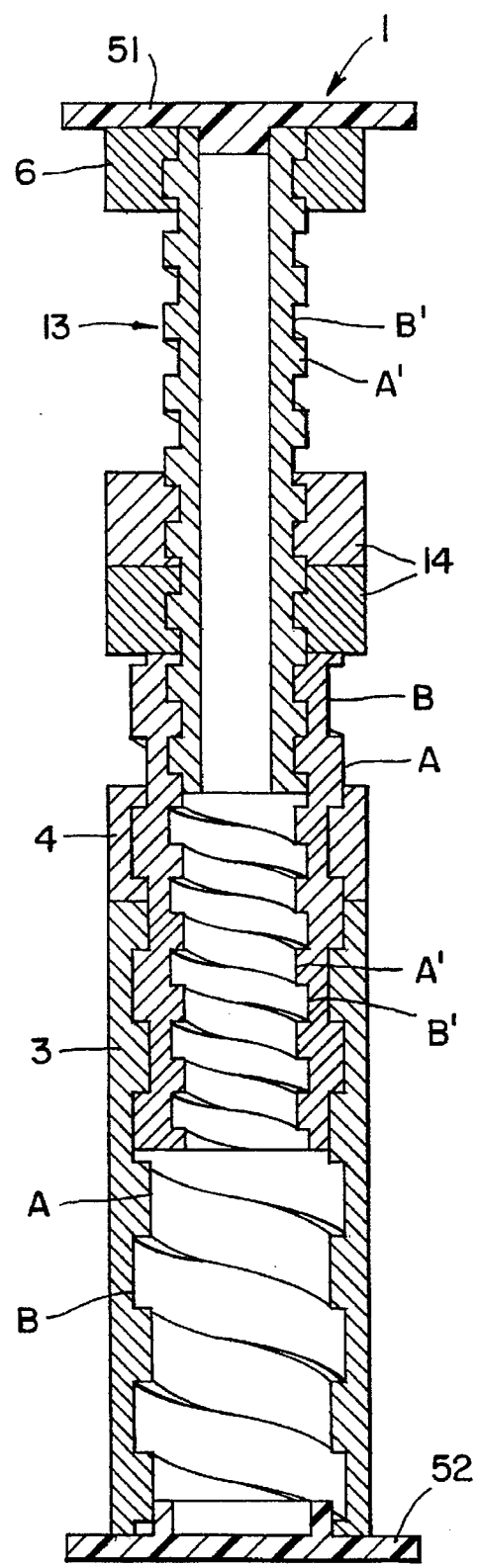

FIGS. 5(a) and 5(b) show a further example of the present invention. The paper tube in the aforesaid examples have the double tube structure and this example has the triple tube structure. The inner tube 2 in this example is different from the foregoing examples in that an additional third tube 13 smaller in diameter than the inner tube is screwed inside the inner tube 2 (which tube 2 is referred to in the foregoing examples), the inner tube 2 has also on its inner surface the steps (i.e., the ridges A' and grooves B') for screwing, and there is added a second tightening tube 14 which fixes the total length of the third tube 13 and the inner tube 2 after the screwing extent between the tubes 13 and 2 is properly adjusted.

EFFECTS OF THE INVENTION

As explained above, the threaded paper tube according to the present invention comprises the multiple paper tube including the inner tube which has the spiral ridges on the outer surface, the outer tube and the tightening tube each having on their inner surfaces the grooves equal in pitches to the spiral ridges, so that the total length is changed by adjustment of the screwing extent between the inner tube and outer tube, and the total length after changed is fixed by rotating and tightening the tightening tube against the outer tube. And the ridges and grooves are obtained by the steps defined by the outer surface of inner tube and the inner surfaces of outer tube and tightening tube and the ribbon-like shaped material paper adhered and fixed at the same pitch on those surfaces. The present invention is quite advanced as having the following various effects.

(1) The main body is made from a paper tube to be light.
(2) A conventional paper tube manufacturing facilities is usable for formation of the spiral steps which are provided for adjustment of the substantial total length of the threaded paper tube. Hence, additional facilities are not required.
(3) Disposal of the products of threaded paper tube may be carried out simply by burning.
(4) The threaded paper tube having a larger diameter may be easily manufactured.

What we claimed is:

1. A threaded paper tube comprising a multiple paper tube including an inner tube having spiral ridges on its outer surface, and an outer tube and a tightening tube each having on their inner surfaces grooves having a pitch corresponding to that of said spiral ridges, so that a total length of the threaded paper tube may be changed by adjustment of a screwing extent between the inner and outer tubes and said total length after changing may be fixed by tightening the tightening tube against the outer tube, wherein the ridges and grooves are provided as steps formed on the inner tube's outer surface, the outer tube's inner surface and the tightening tube's inner surface using a ribbon-like shaped paper material adhered and fixed at the same pitch on those surfaces.

* * * * *